United States Patent
Frank et al.

(10) Patent No.: US 11,293,365 B2
(45) Date of Patent: Apr. 5, 2022

(54) METHOD FOR OPERATING AN INTERNAL COMBUSTION ENGINE, ENGINE CONTROL UNIT AND INTERNAL COMBUSTION ENGINE

(71) Applicant: MTU Friedrichshafen GmbH, Friedrichshafen (DE)

(72) Inventors: Tobias Frank, Friedrichshafen (DE); Jörg Remele, Hagnau (DE); Aron Toth, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 17/131,336

(22) Filed: Dec. 22, 2020

(65) Prior Publication Data

US 2021/0115868 A1   Apr. 22, 2021

Related U.S. Application Data

(63) Continuation of application No. PCT/EP2019/066739, filed on Jun. 25, 2019.

(30) Foreign Application Priority Data

Jun. 26, 2018   (DE) .................. 10 2018 115 305.8

(51) Int. Cl.
  *F02D 41/14*   (2006.01)
  *F02D 41/28*   (2006.01)
  *F02D 41/40*   (2006.01)

(52) U.S. Cl.
  CPC ............. *F02D 41/14* (2013.01); *F02D 41/28* (2013.01); *F02D 41/402* (2013.01)

(58) Field of Classification Search
  CPC ........ F02D 41/14; F02D 41/28; F02D 41/402; F02D 2200/0602; F02D 2041/288;
  (Continued)

(56) References Cited

U.S. PATENT DOCUMENTS 5,176,122 A * 1/1993 Ito ................... F02D 41/2438
                                                123/447
9,540,007 B1 * 1/2017 Davis .................. B60W 10/06
(Continued)

FOREIGN PATENT DOCUMENTS

DE      102004002311 A1 *  8/2005  ......... F02D 41/2096
DE   10 2009 002 793 A1    11/2010
(Continued)

OTHER PUBLICATIONS

"Model-based fault detection and diagnosis for common rail injection systems" by R. Isermann et al, Motortechnische Zeitschrift Feb. 2010, 71st year, pp. 114-121 (8 pages).
(Continued)

*Primary Examiner* — Joseph J Dallo
(74) *Attorney, Agent, or Firm* — Taylor IP, P.C.

(57) ABSTRACT

A method for operating an internal combustion engine, including aligning an injection behavior of the number of injectors. Aligning the injection behavior includes switching off one injector of the number of injectors, detecting a signal of the internal combustion engine that is to be assigned to the switched off injector, determining an alignment characteristic from the signal and assigning the alignment characteristic to the switched off injector as an alignment characteristic assigned to the injector, and switching on the previously switched off injector. Aligning the injection behavior further includes performing the aforementioned steps sequentially for the other injectors of the number of injectors and correcting a control of an injector that is to be corrected using the measured value assigned to the injector that is to be corrected.

20 Claims, 5 Drawing Sheets

(58) Field of Classification Search
CPC ............ F02D 41/0027; F02D 41/2438; F02D 41/0087; F02D 41/2467; F02D 41/0085; F02D 41/3809
See application file for complete search history.

(56) References Cited

U.S. PATENT DOCUMENTS

| | | | | |
|---|---|---|---|---|
| 2001/0025620 | A1* | 10/2001 | Ogawa | F02D 41/047 |
| | | | | 123/295 |
| 2002/0020386 | A1* | 2/2002 | Ogawa | F02D 41/402 |
| | | | | 123/295 |
| 2002/0059919 | A1* | 5/2002 | Ogawa | F01L 1/267 |
| | | | | 123/478 |
| 2002/0157646 | A1* | 10/2002 | Hiraku | F02D 41/3809 |
| | | | | 123/456 |
| 2003/0070653 | A1* | 4/2003 | Ogawa | F02D 41/40 |
| | | | | 123/305 |
| 2003/0164166 | A1* | 9/2003 | Takeuchi | F02D 41/2467 |
| | | | | 123/674 |
| 2004/0007213 | A1* | 1/2004 | Oono | F02D 41/2474 |
| | | | | 123/495 |
| 2005/0092303 | A1* | 5/2005 | Oki | F02D 41/0087 |
| | | | | 123/480 |
| 2009/0177366 | A1* | 7/2009 | Achleitner | F02D 41/3845 |
| | | | | 701/103 |
| 2011/0160983 | A1 | 6/2011 | De Fazio et al. | |
| 2018/0017004 | A1* | 1/2018 | Horii | F02D 41/1498 |
| 2018/0320618 | A1* | 11/2018 | Burgmair | F02D 29/00 |
| 2018/0355812 | A1* | 12/2018 | Burgmair | F02D 41/1402 |
| 2018/0363570 | A1* | 12/2018 | Satria | F02D 19/061 |
| 2018/0363581 | A1* | 12/2018 | Burgmair | F02D 41/1401 |
| 2019/0078530 | A1* | 3/2019 | Burgmair | F02D 41/0027 |
| 2019/0234338 | A1* | 8/2019 | Satria | F02D 41/1401 |
| 2020/0032732 | A1* | 1/2020 | Petitjean, Jr | F02M 55/025 |
| 2020/0271068 | A1* | 8/2020 | Dodis | F02D 41/20 |

FOREIGN PATENT DOCUMENTS

| | | |
|---|---|---|
| DE | 10 2009 044 076 A1 | 3/2011 |
| DE | 10 2012 020 489 A1 | 4/2014 |
| DE | 10 2013 216 255 B3 | 11/2014 |
| DE | 102018115305 B3 * 10/2019 | ........... F02D 41/402 |

OTHER PUBLICATIONS

A general description of the Goertzel algorithm taken from Wikipedia at http://de.wikipedia.org/wiki/Goertzel-Algorithmus, downloaded Dec. 21, 2020 (3 pages).

International Search Report and Written Decision from the International Searching Authority dated Sep. 20, 2019 for International Application No. PCT/EP2019/066739 (13 pages).

* cited by examiner

METHOD FOR OPERATING AN INTERNAL COMBUSTION ENGINE, ENGINE CONTROL UNIT AND INTERNAL COMBUSTION ENGINE

CROSS REFERENCE TO RELATED APPLICATIONS

This is a continuation of PCT application No. PCT/EP2019/066739, entitled "METHOD FOR OPERATING AN INTERNAL COMBUSTION ENGINE, ENGINE CONTROL UNIT AND INTERNAL COMBUSTION ENGINE", filed Jun. 25, 2019, which is incorporated herein by reference.

BACKGROUND OF THE INVENTION

1. Field of the Invention

The invention relates to a method for operating an internal combustion engine, to an engine control unit, and to an internal combustion engine.

2. Description of the Related Art

An internal combustion engine, in particular a diesel engine or a gas engine generally includes a fuel system and a number of cylinders. The fuel system typically comprises a fuel collecting chamber, an injector device with a number of injectors and a fuel feed. A fuel feed is designed such that it fluidly links the fuel collecting chamber and the injector device, so that the fuel from the fuel collecting chamber can be fed to the injector device.

A fuel collecting chamber which is also referred to as a fuel accumulator or high pressure accumulator of a diesel engine stores fuel under high pressure, typically between 1000 and 3000 bar. The fuel in the fuel collecting chamber is brought to and held at an accordingly high pressure level by way of a high pressure pump. In a diesel engine the fuel collecting chamber is typically a common-rail or a common-rail system.

In the case of a gas engine the fuel is stored in a fuel collecting chamber by way of a gas pressure regulator, typically under a pressure of between 0 and 15 bar. Here, the gas generally comes under a system pressure from an accumulator or fuel network, and/or the fuel pressure of the fuel in the fuel collecting chamber is regulated accordingly.

The fuel collecting chamber is generally fluidly linked via a fuel feed with an injector device. In a diesel engine an injector device comprises a number of liquid fuel injectors and in a gas engine the injector device comprises a number of gas fuel injectors. In a gas engine with multi-point injection (MPI) valves a fuel feed is as a rule a gas supply to the MPI valves.

Even with identical control, in particular identical energization, injectors for injecting of fuel into cylinders of an internal combustion engine exhibit production related variation in their opening behavior. This is because injectors partially change their injection behavior over time, because for example volume reduction due to deposits or volume increases due to corrosion at the nozzle occur. For example, deposits can alter the injection duration of injectors over time, because the operating mode of a hydraulic or mechanical opening or closing mechanism of the injector is impaired. Changes in the injection behavior can vary significantly from injector to injector. Under certain circumstances the injection behavior can even vary on newly installed injectors.

The injectors of an internal combustion engine are regularly controlled with identical energization parameters, in particular with identical energization durations. Nevertheless, slightly different fuel volumes are often injected into the individual cylinders. With small injection volumes the variation can be such that some injectors inject fuel into the cylinder assigned to them, whereas others do not open. Thus, in the case of strongly varying injectors, a pre-injection and a post-injection is not representable.

The varying fuel volume in the different cylinders regularly results in that the cylinders perform differently, thus are under different load. The rotational irregularities can for example lead to increased stress and perhaps even to damage of the clutch and the cylinders.

Due to varying fuel volumes in the different cylinders, the cylinders can moreover differ greatly in their cylinder-specific exhaust gas temperatures. This can lead to problems, in particular when small groups of cylinders are combined into one exhaust gas flow which is fed to an exhaust gas treatment, since a well-defined exhaust gas temperature is important for the exhaust gas treatment. Unequal injection volumes can moreover lead to a disparate combustion air ratio in the individual cylinders. Emission and combustion air ratio are strongly correlated and are furthermore non-linearly linked with each other, so that unequal injection volumes on average lead to increased exhaust gas emissions.

If the fuel volumes in the cylinders vary from cylinder to cylinder it could be that individual cylinders are not operated at the engine torque and load matching point, generally causing a reduction in the efficiency of these cylinders.

It is therefore desirable, if possible, to reduce the variation in the opening behavior of the injectors and thus the fuel volume in different cylinders during operation of the combustion engine.

One method for aligning an injection behavior of injectors in an internal combustion engine is known from DE 10 2012 020 489 B4. A method to align an injection behavior of injectors in an internal combustion engine is therein described which includes turning off one injector and detecting a crank angle signal of the internal combustion engine. A Fourier transformation of the crank angle signal is then utilized, and a sum thereof is assigned to the turned off injector. The sum of the harmonic of the 0.5th order of the Fourier transformation of the crank angle signal is utilized as alignment characteristic for the alignment or equalization of the injection behavior. The turned off injector is switched on again and the previous steps are performed sequentially for all injectors of the internal combustion engine. An average value is formed from the stored values for all injectors and control of the injectors is corrected by way of a deviation from the average value of the value assigned to an injector that requires correction from the average value.

Large diesel engines or large gas engines of the same type are certainly often installed in fundamentally different systems, wherein each system has its own unique drive train. Mechanical influences upon the rotational movement of the crankshaft are thus dependent to a high degree on the system in which the engine is installed. For example, a connected piston pump, for example in fracking could produce additional mechanical vibrations—in particular in the $0.5^{th}$ order—on the drive shaft. Inadequate alignment, for example due to settlement of motor and propeller in ships, bearing damage and other mechanical effects can also influence the rotational movement of the engine. The alignment of cylinders on the basis of the speed signal of the crankshaft as known from DE 10 2012 020 489 B4 is thus essentially dependent on the system in which the internal combustion engine is used. Accordingly, it cannot be ruled out that a majority of possible interference factors affecting equalization of cylinders, based on the speed signal of the crankshaft occurs on the side of the system on which an internal combustion engine is used.

In this respect it is moreover desirable for an alignment of an injection behavior of injectors in an internal combustion engine to utilize a more specific basis for the fuel system of an internal combustion engine.

An injector specific diagnosis of a fuel injection device is made possible by way of an individual accumulator pressure (ESD) analysis, as known for example from DE 10 2009 002 793 B4 or DE 10 2013 216 255 B3. During the ESD analysis, the chronological progression is measured closely to each injector and evaluated. For example, on a 20-cylinder engine, twenty additional pressure sensors are installed, each of which are individually wired, monitored, and evaluated. The evaluation of these twenty additional signals does not typically occur in an engine control unit (ECU), but instead in an additional control unit with its own software and its own set of parameters. Still other methods provide high pressure indication of the engine wherein pressure sensors are installed in each combustion chamber. The described solutions thus require also additional sensors with wiring and typically an additional evaluation unit.

In the article "Model-based fault detection and diagnosis for common rail injection systems" by R. Isermann et al. (Motortechnische Zeitschrift 2/2010, $71^{st}$ year, pages 114-121) the possibility of fault detection and diagnosis for common-rail systems is basically discussed, wherein an additional sensor system should be largely renounced. Instead, a model-based calculation of the high pressure on the common rail is used as basis for averaging a high pressure signal from a generally already present common rail high pressure sensor. Based on this, a method for fault recognition in fuel injection in an internal combustion engine is specifically described in disclosure document DE 10 2009 044 076 A1. The model assumes that individual components of the internal combustion engine, for example the high pressure pump or the individual fuel injectors produce periodic fluctuations of the pressure in the high pressure accumulator. The periodic duration always has a fixed ratio to the crankshaft speed.

Through suitable selection and specification of operational values that depend on corresponding periods or temporal intervals, fault sources that are characteristics for the individual frequencies can be detected and identified. It is also described that parameters, such as the pressure in the high pressure accumulator measured by the normally present sensors are detected or can be specified by the electronic control unit, so that no significant expenditure is required for additional sensors or means of data acquisition.

However, the approach by Isermann et al. is strongly based on the underlying modeling. In the analysis method by R. Isermann et al., at least one parameter is recorded during operation, specifically within the framework of the model of the common rail system; for example the pressure in the high pressure accumulator measured with the high pressure sensor; the control current of a flow control valve; the control current of the pressure regulating valve and the engine speed; the crankshaft angle and the fuel injection volume of each fuel injector. On the basis of such parameters, suitable operating values y(t) can be calculated, which are constantly compared during operation with assigned reference values in order to be able to identify individual faults or causes of faults. A comparison is subsequently made between an operating value determined from the parameter and a reference value. Furthermore, several operating values are determined and compared in each case with an assigned reference value in order to subsequently relate the results of the individual comparisons between the operating values and the assigned reference values and to differentiate between different faults and to identify a fault. On comparing an operating value and an assigned reference value a residuum is calculated as difference between operating value and reference value. At least one operating value and one assigned reference value are calculated subject to temporal intervals, which have a predeterminable ratio to a crankshaft speed of the internal combustion engine. The reference values are stored in tables or are converted into polynomial coefficients.

What is needed in the art is a method for improving injection behavior in an internal combustion engine.

SUMMARY OF THE INVENTION

The invention provides aa method for aligning an injection behavior in an internal combustion engine, in particular by improving one of the aforementioned aspects. The variation in the opening behavior of the injectors and thus the amount of fuel in different cylinders during operation of the internal combustion engine should preferably be reduced as much as possible. In particular, to align an injection behavior of injectors in an internal combustion engine one, an essentially more specific basis should be able to be used for the fuel system in the internal combustion engine. The method should in particular allow for a reliable and efficient injector equalization, so that series variation can be compensated. The method should thereby be able to be implemented preferably by a simple and inexpensive manner, and in particular should be able to be carried out during running operation of the internal combustion engine.

The invention also provides an engine control unit, with the assistance of which the method can be implemented. Furthermore, the invention provides an internal combustion engine with a system with which an injection behavior of injectors in the internal combustion engine can be aligned.

The method according to the invention is based on a method of operating an internal combustion engine discussed at the beginning. The internal combustion engine includes a fuel system and a number of cylinders. The fuel system has a fuel collecting chamber, an injector device with a number of injectors and a fuel feed. The fuel feed connects the fuel collecting chamber and the injector device in such a way that fuel can be directed from the fuel collecting chamber to the injector device.

The internal combustion engine can for example be in the embodiment of a liquid fuel engine or a gas engine. Alignment of the injection behavior of injectors preferably causes an equalization of the cylinders of the internal combustion engine. The fuel accumulator can for example—in the case of the liquid fuel engine—be a high pressure fuel accumulator in which the fuel which is pumped into the fuel accumulator by way of a high pressure pump can be stored at a high pressure level, preferably between 1000 and 3000 bar. In the case of a gas engine fuel can be stored typically in the fuel accumulator by way of a gas pressure regulator at a pressure of 0 to 15 bar and as a rule can merely be adjusted.

In the case of a liquid fuel engine the injectors of the injector device are preferably liquid fuel injectors and in the case of a gas engine the injectors of the injection device are preferably gas fuel injectors, in particular gas fuel valves. The method according to the invention includes the following steps for aligning an injection behavior:

Switching off one injector of the number of injectors

Detecting a signal of the internal combustion engine that is to be assigned to the switched off injector Determining an alignment characteristic from the signal and assigning of the alignment characteristic to the switched off injector as an alignment characteristic assigned to the injector Switching on the previously switched off injector Performing the aforementioned steps sequentially for the other injectors of the number of injectors.

The invention is based on the consideration that for the equalization of the cylinders of internal combustion engines methods can basically be used which include inter alia an individual storage pressure (ESD) analysis. However, with in a corresponding method a considerable number of additional sensors is necessary, and evaluation of the sensor signals is correspondingly computationally complex. In this regard the invention recognized at the outset that it is advantageous for equalization of the cylinders of an internal combustion engine to record a more general fuel pressure, since a fuel pressure signal—unlike the speed signal of the crankshaft—is initially essentially independent of the system in which an internal combustion engine is used. In addition, a complex sensor system for each injector or cylinder can largely be avoided with a fuel pressure sensor arrangement at a fuel collecting chamber and/or on the fuel feed. Utilization of the measured fuel pressure signal also avoids analysis that is a computationally too complex.

The invention is also based on the consideration that the fuel pressure can be used to obtain information regarding the injection behavior of injectors and can be used to intervene in a regulating and correcting manner in the injection behavior of injectors of an internal combustion engine. In particular, this should also be possible for large diesel engines with a large fuel system and a comparative large number of injectors. Equalization of cylinders should accordingly also be made possible in the case of large and comparatively complex internal combustion engines.

The invention provides that the detection of the signal includes detection of a transient fuel pressure of the internal combustion engine. The transient fuel pressure is detected by a fuel pressure sensor arrangement at the fuel collecting chamber and/or the fuel feed. The invention also provides that determination of the alignment characteristic includes determination of a measured value. The measured value is assigned to the switched off injector of the number of injectors and is determined by way of a transient algorithm at the transient fuel pressure. The invention further provides that a control of an injector that is to be corrected is corrected, wherein the measured value assigned to the injector that is to be corrected is used.

The invention is based in the knowledge that by way of the measurement of a fuel pressure with a fuel pressure sensor in a location that is relevant for all injectors—namely the fuel collecting chamber and/or the fuel feed—all necessary information can be captured. This is an approach for aligning an injection behavior of the injectors which requires relatively little sensor technology and at the same time facilitates a computationally efficient analysis.

The invention is further based in the knowledge that a measured value which is assigned to the switched off injector of the number of injectors can be determined in a computationally efficient manner by way of a transient algorithm. The invention is preferably used in a method for operating an internal combustion engine in real time, at any rate during operation of the combustion engine.

One advantage of the invention is that, when conducting the calculations advantageous transient algorithms are relied on which at least partially—and then computationally efficiently—use a discrete Fourier transformation, instead of a full Fourier transformation. The transient algorithm can for example be a discrete Fourier transformation for a period of time. In particular, the Goertzel algorithm can be used to efficiently calculate a Fourier transformation for few spectral components. Accordingly, a measured value is the result of a discrete Fourier transformation which is applied to the detected fuel pressure.

A measured value is preferably determined in succession for each injector of the number of injectors. This means that after a measured value has been determined for an injector, it is switched on again and a next injector is switched off. For the next injector, a measured value assigned to this injector is then accordingly determined. Precisely one measured value is determined for each injector of the number of injectors. However, it is also conceivable that several measured values are determined for an injector, which are then used for example for averaging. The method is preferably repeated at certain time intervals, so that at certain time intervals a new set of injector associated measured values are determined.

It is also conceivable that more than one injector of the number of injectors is switched off simultaneously. A detected signal and a measured value determined therefrom can be assigned to the group of switched off injectors.

With this concept it is already possible to correct a control of an injector that is to be corrected, in that the measured value assigned to the injector that is to be corrected is used. The measured value is in particular detected, stored and evaluated.

The invention also provides an engine control which is configured to adapt an injection behavior for implementation of the described method.

The invention also provides an internal combustion engine with a system for aligning an injection behavior of injectors in the internal combustion engine, wherein the system is designed to implement the method according to the concept of the invention. The system comprises a switch which is designed to selectively switch an injector off and on. The system moreover comprises a monitor module, used to detect a transient fuel pressure of the internal combustion engine that is measured by a fuel sensor. The system furthermore has a computer module which is designed to determine a measured value by way of a transient algorithm from the captured transient fuel pressure and to allocate the measured value to the switched off injector. The system moreover has a fuel adjuster which is designed to correct a control of an injector which is to be corrected by using the measured value assigned to the injector which is to be corrected.

The method may be repeated in such a way that after determination of injector-assigned measured values a correction of the energization duration to the injectors is performed in order to match the injection behavior of the injectors to one another. Thereafter, injector assigned measured values are again determined and a correction of the energization duration to injectors is subsequently performed. The steps for determining of injector assigned measured values and a subsequent correction of the energization duration may be repeated until an energizing duration that is within a predetermined fault interval or below a threshold value is achieved repetitively by way of the method.

Control of the injectors is preferably corrected in such a way, that the overall performance of the internal combustion engine is not changed thereby.

The fuel pressure can also be detected advantageously without additional sensors, wiring or evaluation unit.

The control of the injectors is preferably corrected by adapting an energization duration to the injectors. The energizing duration is typically the injection period. It may however also be advantageous to adapt an injection frequency, for example in the case of a multiple injection.

The method may comprise the following further steps:
Identifying an injector to be corrected on the basis of the measured value assigned to the injector and/or
Correcting a control in that an energization to the injector that is to be corrected is corrected, wherein the measured value assigned to the injector to be corrected is used.

In a further development the internal combustion engine is a liquid fuel engine and the fuel collecting chamber comprises a common rail. In the common rail the liquid fuel is stored under high pressure. The fuel pressure sensor measures the fuel pressure of the fuel stored in the common rail.

In a further development the internal combustion engine is a gas engine, and the fuel feed includes a collective gas supply. The fuel pressure sensor measures the gas pressure of the gas fuel stored in the collective gas supply.

In a further development the fuel pressure sensor arrangement for measuring the transient fuel pressure for determining the measurement value includes a collective high pressure sensor which is also used for fuel injection. In particular, the fuel pressure sensor arrangement includes the collective high pressure sensor as the only pressure sensor. In a common rail, the collective high pressure sensor is typically the rail pressure sensor.

The fuel pressure is preferably detected by the fuel pressure sensor arrangement over at least one operating cycle of a cylinder in the internal combustion engine.

In another development the fuel pressure sensor arrangement for measuring the transient fuel pressure for determining the measurement value includes a fuel pressure sensor which is assigned to a group of cylinders. The group of cylinders represents a subset of all cylinders. The fuel pressure sensor is preferably arranged on a position on the common rail assigned to the group. In particular, the fuel pressure sensor is in addition to the collective high pressure sensor.

In another development the subset of cylinders consists of the cylinders of the A-side or the cylinders of the B-side of the internal combustion engine. The fuel pressure sensor may be arranged on a side assigned to the A-side of the common rail, or on a side assigned to the B-side of the common rail. In such an embodiment, a collective high pressure sensor can be advantageously omitted.

Advantageously, one fuel pressure sensor can in each case be assigned to the A-side and an additional fuel pressure sensor to the B-side. In one variation for example, one fuel pressure sensor is arranged on the A-side and assigned to same and an additional fuel pressure sensor is arranged on the B-side and assigned to it. In another variation, a fuel pressure sensor is arranged on the A-side and is assigned to the B-side and an additional fuel pressure sensor is arranged on the B-side and is assigned to the A-side. In particular, in the two described variations, a collective high pressure sensor can be omitted.

The fuel pressure sensors arranged on the A-side and on the B-side respectively each measure a fuel pressure. An average value can then be formed for example from the detected fuel pressures, and a measured value can then be determined from the average value.

In one variation the fuel pressure sensor on the A-side and the additional fuel pressure sensor on the B-side alternatively measure a fuel pressure. A measured value can then for example be directly determined from the alternately detected fuel pressures; or an average value can be formed from the alternately detected fuel pressures, and a measured value can be determined from the average value.

In one variation the measured values of all cylinders are initially determined only with the fuel pressure sensor on the A-side, and subsequently the measured values of all cylinders are determined only with the other fuel pressure sensor on the B-side.

In a further development a number of sensors comprise a collective high pressure sensor and at least one additional fuel pressure sensor. The at least one fuel pressure sensor may be assigned to a group of cylinders. In particular, the at least one fuel pressure sensor is assigned to the cylinders on an A-side or to the cylinders on a B-side of a common rail or a common rail system. From the fuel pressures detected by the collective high pressure sensor and by the at least one additional fuel pressure sensor an average value can again be formed and from this in turn a measured value can be determined.

In a further development a number of sensors comprise a collective high pressure sensor and several additional fuel pressure sensors. In one variation each of the sensors successively measure a fuel pressure. From each of the successively detected fuel pressures a measured value can be determined directly; or from each of the successively detected fuel pressures an average value can be formed and from the average value a measured value can then be determined.

In one variation the measured values of all cylinders are determined successively individually for each cylinder, initially only with a first of the sensors. Subsequently, the measured values of all cylinders are determined with only a second one of the sensors. This process is repeated until each sensor of the number of sensors has determined the measured values of all cylinders at least once.

In a further development, a measured value assigned to a cylinder to be corrected or a value derived from the measured value is used to correct a control in a cylinder that is to be corrected.

The measured value in particular reflects an inequality in the fuel volume introduced into different cylinders of the internal combustion engine. The measured value is advantageously used for equalization of the fuel volume in the different cylinders.

An average value is preferably formed from the captured measured values assigned to the individual injectors or to a group of injectors. Control of an injector to be corrected can then be advantageously corrected on the basis of a deviation of the measured value assigned to the injector to be corrected from the associated average value formed from the measured values.

In a further development a transient fuel pressure is detected when all injectors are switched on. From this transient fuel pressure a measured value assigned to all injectors is then determined. Moreover, a differential value can be calculated from the difference between a measured value assigned to one injector and the measured value assigned to all injectors.

An average value is preferably formed from all differential values assigned to the individual injectors. The control of an injector to be corrected is corrected on the basis of a deviation of the differential value assigned to the injector to be corrected from the average value formed from all differential values.

A correction of the control of an injector is preferably only performed if the deviation of the average value exceeds a predetermined threshold value.

In a further development at least two iterations of the method are implemented, wherein the process is repeated successively for the injectors of the internal combustion engine until the deviation for each of the injectors to be corrected falls below the predetermined threshold value. The number of iterations can also be limited in that the process is terminated after a predetermined number of iterations. This is especially advantageous if the predetermined threshold value—for example due to a fault—cannot be reached. Thus, an additional termination criterion is advantageously specified, as a result of which the number of iterations is limited. The number of permissible iterations can for example be determined by the operating duration of an engine.

The detected transient fuel pressure is preferably detected in an angle synchronous and/or time synchronous manner. If the transient fuel pressure is detected in a time synchronous manner, the information in regard to the duration of an operating cycle must however generally also be captured. This is due to the fact that the method must calculate from the scanned values of the signal within a defined multiple of the duration of an operating cycle (i.e. scanned values of an individual operating cycle).

BRIEF DESCRIPTION OF THE DRAWINGS

Embodiments of the invention are described below with reference to the drawings. This is not intended to depict the embodiments necessarily according to scale, but in as far as beneficial for explanatory purposes is executed schematically and/or slightly distorted. In regard to additions of teachings immediately apparent from the drawing, reference is made to the pertinent state of the art. It must herein be considered that manifold modifications and changes in regard to shape and detail of an embodiment can be undertaken, without deviating from the general idea of the invention. The characteristic of the invention disclosed in the description, in the drawings and in the claims can be essential individually as well as in any combination for further development of the invention. Moreover, all combinations consisting of at least two features disclosed in the description, the drawings and/or the claims fall within the scope of the invention. The general idea of the invention is not limited to the exact shape or detail of the embodiments illustrated and described below, or limited to an object that would be limited compared to the object claimed in the claims.

In the case of specified design ranges, values within the specified limits should also be disclosed as threshold values and should be able to be used and claimed as desired. For the sake of simplicity the same identification references are used below for identical or similar parts or for parts fulfilling an identical or similar function.

Figure 1:
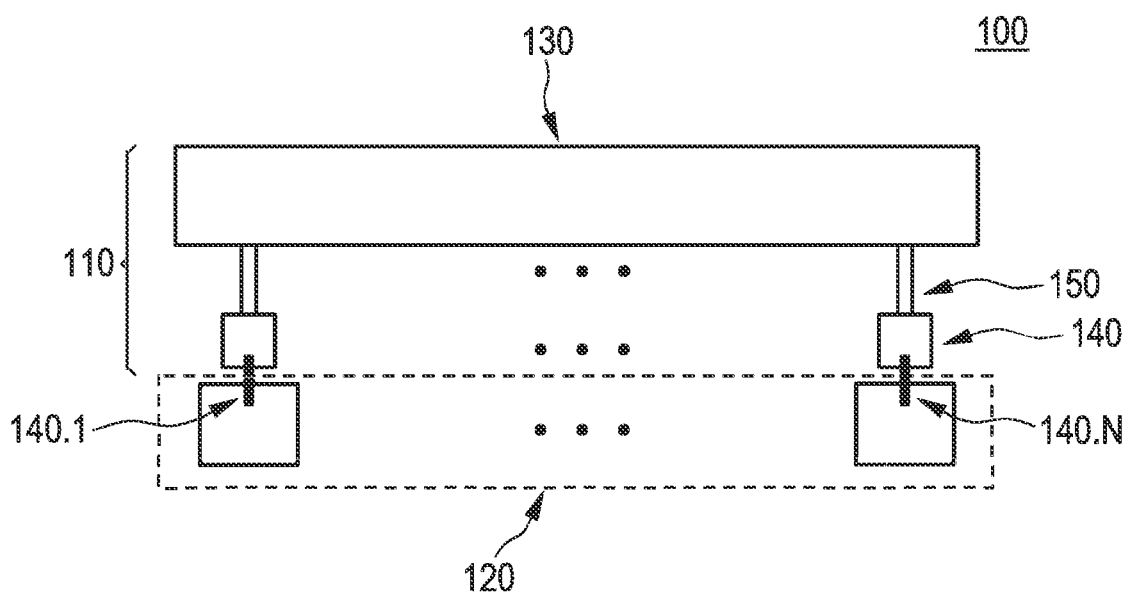
Figure 2:
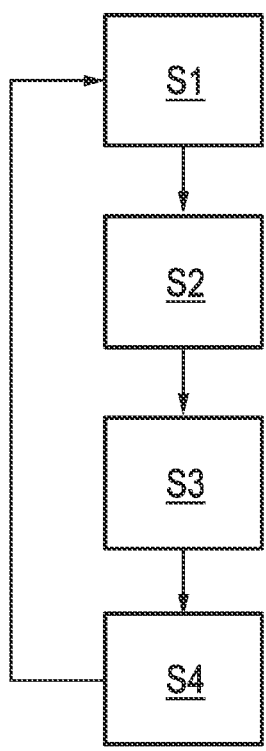
Figure 3:
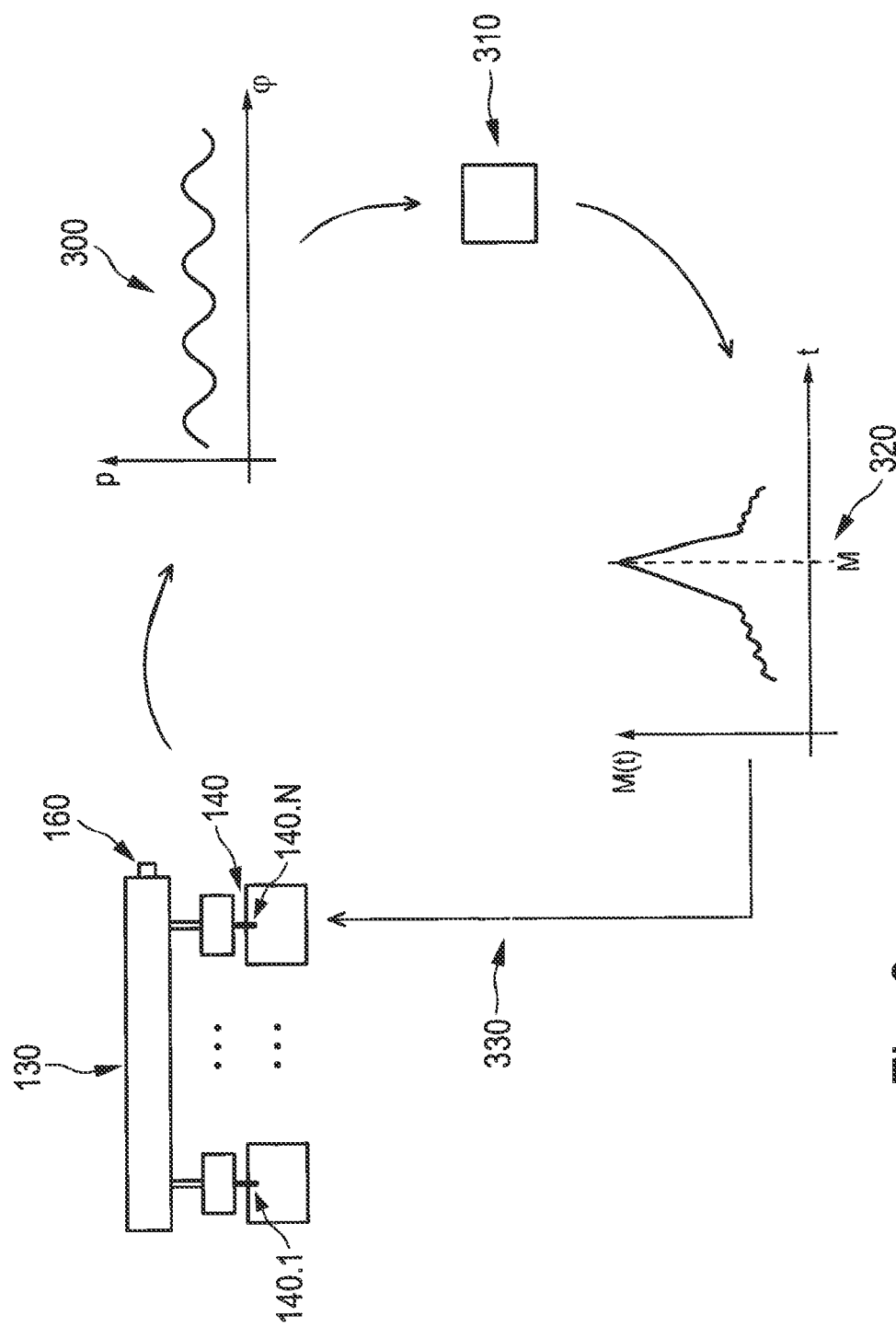
Figure 4C:
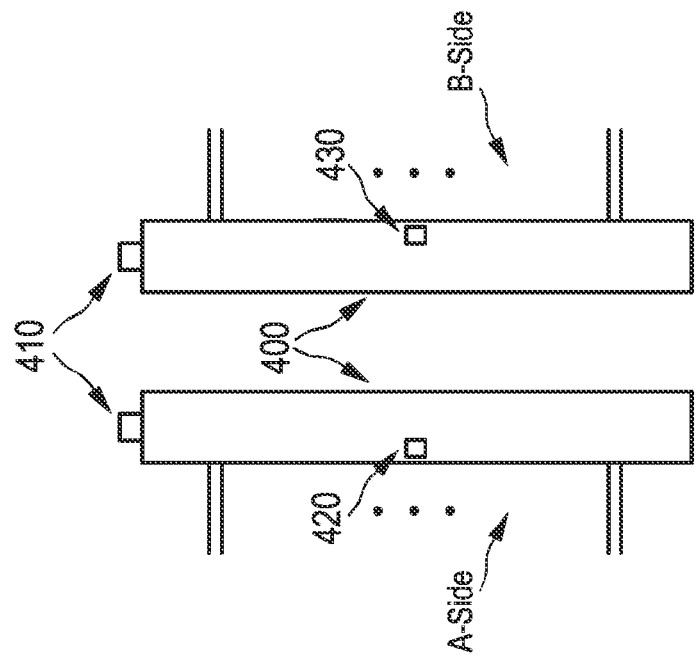
Figure 4B:
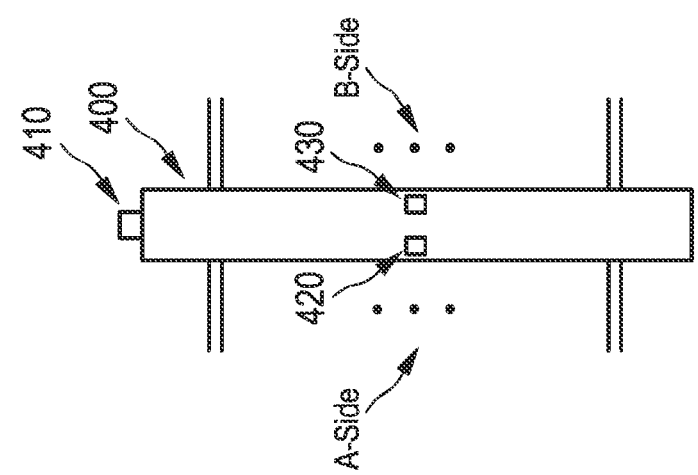
Figure 4A:
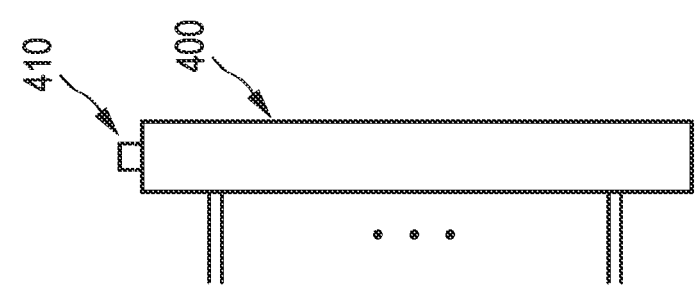
Figure 5:
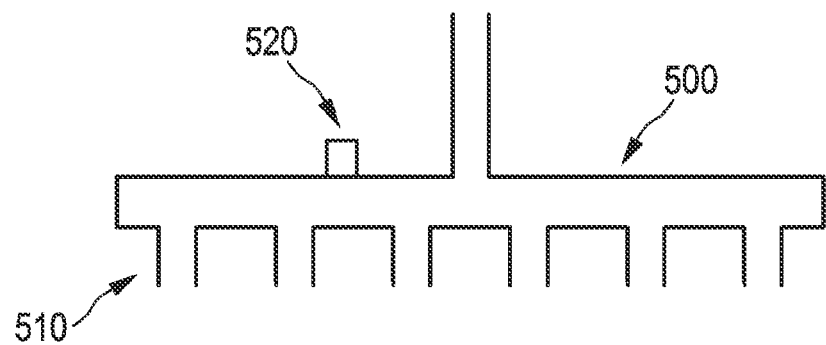

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a schematic view of an internal combustion engine with a fuel system and a number of cylinders;

FIG. 2 is an embodiment of a method for aligning an injection behavior of injectors of an internal combustion engine, FIG. 3 is a schematic diagram for determining a fuel pressure by way of a transient algorithm;

FIGS. 4A, 4B, and 4C illustrate various options for sensor arrangements at a fuel collecting chamber; and FIG. 5 is a schematic view of an embodiment of a fuel feed for a gas engine with multipoint injection (MPI) valves.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

FIG. 1 illustrates an internal combustion engine 100, in particular a liquid fuel engine or a gas engine, with a fuel system 110 and a number of cylinders 120. Fuel system 110 comprises a fuel collecting chamber 130 in which in which fuel, for example liquid fuel or gas fuel is stored under high pressure. In the case of a liquid fuel engine, a fuel collecting chamber is typically a common rail in which fuel is kept by way of a high pressure pump at a high pressure level of typically between 1000 and 3000 bar.

Fuel system 110 moreover comprises an injector device 140 with a number of injectors 140.1 to 140.N. The injectors of the injector device can for example be liquid fuel injectors or gas fuel injectors. Injectors 140.1 to 140.N of injector device 140 are provided for the purpose of injecting the fuel stored in the one fuel collecting chamber 130 into cylinders 120, in particular into the combustion chamber of the cylinders of internal combustion engine 100. The same amount of fuel is preferably injected into all cylinders, so that all cylinders are subject to the same load during operation of the internal combustion engine. In the illustrated embodiment, one injector is always assigned to exactly one cylinder. In an embodiment not illustrated her, several injectors of a number of injectors can also be assigned to respectively one cylinder.

Fuel system 110 furthermore comprises a fuel feed 150. Fuel feed 150 connects fuel collecting chamber 130 and injector device 140 in such a way that fuel from fuel collecting chamber 130 can directed from fuel collecting chamber 130 to injector device 140, in particular to the number of injectors 140.1 to 140.N. In other words, the fuel feed 150 may be in the form of a fuel supply line. In one embodiment which is not illustrated here, a fuel feed consists of a high pressure line which feeds fuel from a common rail to an injector of an injector device.

FIG. 2 is a flow chart, illustrating a preferred embodiment of a method for aligning an injection behavior of injectors of an internal combustion engine.

In a first step S1, a single injector from the number of injectors 140.1 to 140.N is switched off; in fact, a number of injectors could basically also be switched off—this would however result in that, that a signal which is then detected and an alignment characteristic or respectively a measured value that is to be determined, is decisive for this group and less for an individual injector as indicated in this design example. Nevertheless, the procedure described can also be appropriate when applied analogously to a group of injectors.

In a next step 2, a signal of the internal combustion engine assigned to the switched off injector is detected. In a subsequent step 3 an alignment characteristic feature is determined from the signal. The alignment characteristic is assigned to the switched off injector as an alignment characteristic assigned to the injector. After an alignment characteristic that is assigned to the switched off injector has been detected, the previously switched off injector is switched on again in next step S4. At least steps S1 to S4 are performed sequentially for the further injectors, preferably for all injectors of the number of injectors 140.1 to 140.N, so that for each of the injectors a measured value assigned to at least one of the injectors is determined.

When the signal is detected, a transient fuel pressure of an internal combustion engine is detected. The transient fuel pressure is preferably detected with a fuel pressure sensor— for example, a rail pressure sensor—on a fuel collecting chamber, for example a common rail and/or a fuel feed of a fuel system of an internal combustion engine. Advantageously, no additional sensors are necessary to detect the fuel pressure, but the fuel pressure can instead be measured with an already provided collective high pressure sensor. In various embodiments not illustrated here, a number of additional fuel pressure sensors can be provided in addition or alternatively to the already provided collective high pressure sensor in order to detect the fuel pressure for the purpose of aligning the injection behavior of injectors. This means, the fuel pressure introduced into the process for the purpose of aligning the injection behavior of injectors can be measured by the collective high pressure sensor or by an additional fuel pressure sensor or by both.

Determination of an alignment characteristic includes determination of a measured value which is preferably detected, stored, and evaluated. The measured value is assigned to the switched off injector of the number of injectors and is determined preferably by way of a transient algorithm at the transient fuel pressure. The transient algorithm is preferably the known Goertzel algorithm with which a discrete Fourier transformation can be computationally efficiently calculated for individual discrete spectral components of the transient fuel pressure.

A general description of the Goertzel algorithm can be found for example under http://de.wikipedia.org/wiki/Goertzel-Algorithmus and specifically in the article by Isermann et al., the contents of which—by citation—is hereby incorporated into the current application to describe the application of the Goertzel algorithm to the transient fuel pressure signal at the fuel collecting chamber and/or the fuel feed, such as the common rail or collective gas supply for determining the measured value.

To correct a control of an injector that is to be corrected, the measured value assigned to the injector to be corrected is then used.

In an embodiment not illustrated here, an injector to be corrected is identified on the basis of the determined alignment characteristics, in particular on the basis of an alignment characteristic assigned to an injector. The control, especially the energization of the injector to be corrected is then corrected. For example, an average value can be formed from the determined alignment characteristics and a deviation from the average value can be determined for each of the alignment characteristics assigned to an injector. If the deviation of an alignment characteristic from the average value for an injector exceeds a predefined threshold value, control of the injector can be changed in such a way that the deviation in regard to the average value is minimized.

It is also possible to determine an alignment characteristic when all injectors are switched on. A corresponding alignment characteristic is then assigned to all injectors.

An alignment characteristic assigned to an injector can then be determined for each injector by performing steps S1 through S4. For each of the injectors, a differential value can then be determined from the difference between the alignment characteristic assigned to one injector and the alignment characteristic assigned to all injectors. An average can then be formed from the number of the alignment characteristics assigned respectively to one of the injectors. A deviation can then be determined from the deviation of a differential value assigned to one of the injectors from this average value. If the deviation of a differential value from the average value exceeds a predefined threshold value for one of the injectors, control of the injector can be changed in such a way that the deviation in regard to the average value is minimized.

FIG. 3 is a schematic diagram for determining a measured value, wherein the measured value is assigned to the switched off injector of the number of injectors and is determined by way of a transient algorithm at the transient fuel pressure. First, one injector of the number of injectors 140.1 to 140.N of an injector device 140 is switched off. As a result the amplitude of a periodic pressure fluctuation component can for example change at a certain frequency in the fuel pressure. A transient fuel pressure is captured in an angle-synchronous manner 300 at fuel collecting chamber 130 by way of a fuel pressure sensor 160. Alternatively, the transient fuel pressure can also be detected in a time synchronous manner. A measured value is then preferably determined directly from the detected transient fuel pressure by way of a transient algorithm 310, in particular by way of the Goertzel algorithm. In other words, a measured value allocated to an injector is determined preferably by way of a discrete Fourier transformation, which is only calculated for individual discrete spectral ranges.

The result of the discrete Fourier transformation is a measured value 320, which is presented symbolically as an evaluation of a "function" in the lower section of FIG. 3. Measured value M can for example be the amplitude of a periodic pressure fluctuation component of the common rail pressure at a certain frequency. This determined measured value M is then assigned to the switched off injector in step 330.

FIGS. 4A, 4B, 4C show various options of sensor arrangements on a fuel collecting chamber. A common rail is illustrated in FIG. 4A and FIG. 4B. In FIG. 4C, there is shown a common rail system with two tubular high pressure accumulators. A collective high pressure sensor 410 is installed on common rail 410, shown in FIG. 4A, which measures the fuel pressure for regulating the fuel injection. The fuel pressure measured by this one collective high pressure sensor 410 can be captured in an angle synchronous or time synchronous manner, and a measured value can be determined by way of a transient algorithm from this captured transient fuel pressure.

FIG. 4B illustrates a common rail 400 on which a collective high pressure sensor 410 is mounted. At least one additional pressure sensor 420, 430 can also be attached to the common rail. For example, two additional fuel pressure sensors 420 and 430 can be attached to the common rail. Each of the three sensors measures a fuel pressure. At least one of the fuel pressures can be captured in an angle synchronous or time synchronous manner in order to determine a measured value from the transient fuel pressure. In the herein illustrated embodiment, fuel pressure sensor 420 is arranged on the A-side and is assigned to the injectors on the A-side. This means that a measured value that is assigned to an injector on the A-side was determined from a fuel pressure that was measured by fuel pressure sensor 420 mounted on the A-side. Fuel pressure sensor 430 is arranged on the B-side and is assigned to the injectors on the B-side. This means that a measured value that is assigned to an injector on the B-side was determined from a fuel pressure that was measured by fuel pressure sensor 430 mounted on the B-side.

In one embodiment not illustrated here, only sensors 420 and 430 are arranged on common rail 400, so that collective high pressure sensor 410 can be omitted in this embodiment.

In one embodiment not illustrated here, fuel pressure sensor 420 is arranged on the A-side but is assigned to the injectors on B-side. This means that a measured value which is assigned to an injector on the B-side was determined from a fuel pressure that was measured by fuel pressure sensor 420 which is mounted on the A-side. In this embodiment, fuel pressure sensor 430 is arranged on the B-side, but assigned to the injectors on the A-side. This means, that a measured value assigned to an injector on the A-side was determined from a fuel pressure measured by fuel pressure sensor 430 which is mounted on the B-side.

It is also conceivable that several sensors, for example collective high pressure sensor 410 and the two fuel pressure sensors 420 and 430 each measure a fuel pressure and that the measured fuel pressures are averaged. A measured value can then be determined from the averaged fuel pressure. The embodiments discussed in reference to FIG. 4B can be transferred to a common rail system, as shown in FIG. 4C. The common rail system illustrated in FIG. 4C comprises two common rails 400, wherein the one common rail is assigned to the A-side and the other common rail is assigned to the B-side. In the illustrated embodiment, each of the common rails has its own collective high pressure sensor. In a common rail system it is in particular suggested to determine a measured value for an injector of the A-side from a fuel pressure which was measured by a fuel pressure sensor 420 on A-side and/or by the collective high pressure sensor assigned to the A-side, and to determine a measured value for an injector of the B-side from a fuel pressure which was measured by a fuel pressure sensor 430 on B-side and/or by the collective high pressure sensor assigned to the B-side.

In one embodiment not illustrated here only sensors 420 and 430 are arranged on the common rail system, so that collective high pressure sensors 410 on common rails 400 are omitted in this embodiment.

In one embodiment not illustrated here, fuel pressure sensor 420 is arranged on the A-side but is assigned to the injectors on B-side. This means that a measured value which is assigned to an injector on the B-side was determined from a fuel pressure that was measured by fuel pressure sensor 420 which is mounted on the A-side. In this embodiment, fuel pressure sensor 430 is arranged on the B-side, but assigned to the injectors on the A-side. This means, that a measured value assigned to an injector on the A-side was determined from a fuel pressure measured by fuel pressure sensor 430 which is mounted on the B-side.

FIG. 5 illustrates a preferred embodiment of a fuel feed 500 of a gas engine with multi-point injection (MPI) valves 510. The illustrated fuel feed is in particular a gas supply to MPI valves 510. The fuel pressure of the gas fuel is advantageously measured by a fuel pressure sensor 520 which is mounted on gas fuel feed 500 to MPI valves 510.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

100 internal combustion engine
110 fuel system
120 number of cylinders
130 fuel collecting chamber
140 injector device
140.1 to 140.N number of injectors
150 fuel feed
160 fuel pressure sensor
300 angle synchronous detection of a transient fuel pressure
310 determination of a measured value
320 measured value
330 assignment of a measured value to a switched off injector
400 common rail
410 collective high pressure sensor
420, 430 fuel pressure sensors
500 fuel feed of a gas engine
510 multi-point injection (MPI) valves
520 fuel pressure sensor
S1 switching off an injector
S2 detection of a signal from the internal combustion engine assigned to a switched off injector
S3 determining an alignment characteristic from the signal
S4 Switching on the previously switched off injector

What is claimed is:

1. A method for operating an internal combustion engine, comprising:
   providing a fuel system, a number of cylinders, a fuel pressure sensor arrangement, wherein the fuel system comprises a fuel collecting chamber, an injector device with a number of injectors, and a fuel feed which fluidly links the fuel collecting chamber and the injector device, so that the fuel from the fuel collecting chamber can be fed to the injector device; and
   aligning an injection behavior of the number of injectors, the aligning having an absence of detecting a pressure drop in the fuel collecting chamber when carrying out a plurality of injections while a supply of the fuel to the fuel collecting chamber is stopped, which comprises the following steps:
   switching off one injector of the number of injectors;
   detecting a signal of the internal combustion engine that is to be assigned to the switched off injector, wherein detecting the signal includes detecting a transient fuel pressure of the internal combustion engine, wherein the transient fuel pressure is detected by the fuel pressure sensor arrangement at the fuel collecting chamber and/or the fuel feed;
   determining an alignment characteristic from the signal and assigning the alignment characteristic to the switched off injector as an alignment characteristic assigned to the injector, wherein determining the alignment characteristic includes determining a measured value, by way of a transient algorithm at the transient fuel pressure, and assigning the measured value to the switched off injector of the number of injectors;

switching on the previously switched off injector;

performing the aforementioned steps sequentially for the other injectors of the number of injectors; and correcting a control of an injector that is to be corrected, wherein the measured value assigned to the injector that is to be corrected is used.

2. The method according to claim 1, further comprising:

identifying an injector to be corrected on the basis of the measured value assigned to the injector; and/or correcting a control by correcting an energization to the injector that is to be corrected, using the measured value assigned to the injector to be corrected.

3. The method according to claim 1, wherein the internal combustion engine is a liquid fuel engine, wherein the fuel collecting chamber is a common rail in which the liquid fuel is stored under high pressure.

4. The method according to claim 3, wherein the fuel pressure sensor arrangement comprises a fuel pressure sensor which measures a fuel pressure of the fuel stored in the common rail.

5. The method according to claim 1, wherein the internal combustion engine is a gas engine, wherein the fuel feed comprises a collective gas supply.

6. The method according to claim 5, wherein the fuel pressure sensor arrangement comprises a fuel pressure sensor which measures a gas pressure of the gas fuel stored in the collective gas supply.

7. The method according to claim 1, wherein the fuel pressure sensor arrangement for measuring the transient fuel pressure for determining the measurement value comprises a collective high pressure sensor, wherein the collective high pressure sensor is the only pressure sensor which is also used for fuel injection.

8. The method according to claim 1, wherein the fuel pressure sensor arrangement for measuring the transient fuel pressure for determining the measurement value comprises a collective high pressure sensor and at least one additional fuel pressure sensor in addition to the collective high pressure sensor which is assigned to a group of cylinders, representing a subset of all cylinders, wherein the at least one additional fuel pressure sensor is arranged on a common rail which is assigned to the group.

9. The method according to claim 8, wherein the subset of all cylinders consists of cylinders of an A-side of the common rail or cylinders of a B-side of the common rail of the internal combustion engine, wherein the at last one additional fuel pressure sensor is arranged on a side assigned to the A-side of the common rail or on a side assigned to the B-side of the common rail.

10. The method according to claim 1, wherein the fuel pressure sensor arrangement comprises a number of sensors comprising a collective high pressure sensor and at least one additional fuel pressure sensor, wherein the at least one additional fuel pressure sensor is assigned to a group of cylinders on an A-side or a group of cylinders on a B-side of a common rail or a common rail system.

11. The method according to claim 1, wherein a measured value assigned to a cylinder to be corrected or a value derived from the measured value is used to correct a control in a cylinder that is to be corrected.

12. The method according to claim 1, wherein the measured value reflects an inequality in a fuel volume introduced into different cylinders of the internal combustion engine and is used for equalization of the fuel volume in the different cylinders.

13. The method according to claim 1, wherein an average value is formed from multiple detected measured values assigned to the individual injectors, and wherein control of an injector to be corrected is corrected on the basis of a deviation of the measured value assigned to the injector to be corrected from the average value formed from the measured values.

14. The method according to claim 1, wherein a transient fuel pressure is detected when all injectors are switched on, and from this transient fuel pressure a measured value assigned to all injectors is determined, and wherein moreover, a differential value is calculated from the difference between a measured value assigned to one injector and the measured value assigned to all injectors.

15. The method according to claim 14, wherein an average value is formed from all differential values assigned to the individual injectors, and the control of an injector to be corrected is corrected on the basis of a deviation of the differential value assigned to the injector to be corrected from the average value formed from all differential values.

16. The method according to claim 13, wherein the step of correcting the control of an injector is only performed if the deviation of the average value exceeds a predetermined threshold value.

17. The method according to claim 16, wherein at least two iterations of the method are performed, wherein the process is repeated successively for the injectors of the internal combustion engine until the deviation for each of the injectors to be corrected falls below the predetermined threshold value.

18. The method according to claim 1, wherein the detected transient fuel pressure is detected in an angle synchronous and/or a time synchronous manner.

19. An engine control unit for operating an internal combustion engine, wherein the engine control unit is designed to align an injection behavior of injectors for implementation of a method according to claim 1.

20. An internal combustion engine, comprising:

a number of cylinders;

a fuel system comprising a fuel collecting chamber, an injector device with a number of injectors, and a fuel feed which fluidly links the fuel collecting chamber and the injector device, so that the fuel from the fuel collecting chamber can be fed to the injector device;

a fuel sensor; and a system for aligning an injection behavior of the injectors, the system for aligning having an absence of a structure configured for detecting a pressure drop in the fuel collecting chamber when carrying out a plurality of injections while a supply of the fuel to the fuel collecting chamber is stopped, the system comprising:

a switch designed to selectively switch an injector off and on;

a monitor module designed to capture a transient fuel pressure of the internal combustion engine which is measured by the fuel sensor;

a computer module designed to determine a measured value by way of a transient algorithm from the captured transient fuel pressure and to allocate the measured value to the switched off injector; and a fuel adjuster designed to correct a control of an injector which is to be corrected by using the measured value assigned to the injector which is to be corrected.

* * * * *